United States Patent [19]

Evalds et al.

[11] 4,081,691
[45] Mar. 28, 1978

[54] CONTROLLER FOR A MULTIPLE STAGE POWER DEVICE HAVING INTERCHANGEABLE CONTROL UNITS

[75] Inventors: Egils Evalds, Ardmore; Ernest F. Coccio, Conshohocken, both of Pa.

[73] Assignee: Athena Controls Inc., West Conshohocken, Pa.

[21] Appl. No.: 712,027

[22] Filed: Aug. 5, 1976

[51] Int. Cl.² ............................................. H02J 3/14
[52] U.S. Cl. .................................... 307/41; 307/117; 236/1 E
[58] Field of Search ...................... 165/26, 27, 30, 12; 236/1 E; 307/11, 38, 39, 41, 117; 361/413, 415

[56] References Cited

U.S. PATENT DOCUMENTS

| 3,730,819 | 5/1973 | Evalds | 165/30 |
| 3,770,977 | 11/1973 | McIntosh | 307/41 |

Primary Examiner—Robert K. Schaefer
Assistant Examiner—Morris Ginsburg
Attorney, Agent, or Firm—William E. Cleaver

[57] ABSTRACT

The present device incrementally adds or subtracts power units to and from a heating or cooling system and employs a major control board into which are plug-connected a plurality of minor control boards. The minor control boards have varying designs. Some are designed to accept different signals from different types of temperature monitoring means and are designed to convert those different signals into common command signals, while other minor control boards are designed to accept those command signals in order to communicate with and control yet others of said minor control boards to effect a turning on and/or turning off of said heating or cooling power units according to at least two different modes of operation. The major control board provides a power source for the minor control boards and provides the circuit paths to enable the minor control boards to transmit signals among any set of such mounted boards.

6 Claims, 8 Drawing Figures

CONTROLLER FOR A MULTIPLE STAGE POWER DEVICE HAVING INTERCHANGEABLE CONTROL UNITS

BACKGROUND

There are many facilities which require that energy, such as that necessary to provide heat, refrigeration or simply electrical power, be added and/or subtracted incrementally. For instance, in an institution, or a large office building, having a substantial number of window air conditioners, if all of the air conditioners were turned on at the same time, there would be a requirement that the electrical energy be supplied incrementally. If this were not the case, the instantaneous electrical current demand would be extremely high and if not controlled in some way, would cause circuit breakers to be tripped and/or equipment to be damaged.

It has been determined that it is preferable to add an increment of power, then allow the surge condition to settle, and thereafter add another increment of power until such time as the full demand has been met. These problems are also present when power is turned off and therefore it is desirable to turn off power by increments. My two patents numbered U.S. Pat. Nos. 3,730,819 and 3,717,300 describe systems for adding and subtracting power units in heating and cooling systems. While these patented systems have been quite satisfactory, there has been a need for a more flexible controller system which can operate with any one of a plurality of user's monitoring signals and which can operate either in a "first-on, first-off" mode of operation, or a "first-on, last-off" mode of operation. The present system provides this flexibility.

SUMMARY

The present system includes a major control board which has a plurality of plug in locations thereon. At each plug-in location there is mounted a plurality of terminal pins. One side of each of the terminal pins fits into an associated slot in a yaxley-type plug means mounted on a minor control board. The other side of each terminal pin provides a means for connecting wires, or a means for connecting printed circuit paths. The minor control boards each have female (slot) type yaxley-plug means and can be changed from one "plug in" location on the major boards to another location. The major control board has a power circuit mounted thereon which provides electrical power to the minor control boards so that signals can be generated and transmitted along paths between the various minor control boards. The circuit paths for said signal transmission, are located on the major control board and in effect provide an electrical connection between the minor control boards. The plurality of minor control boards include various designs. Some of the minor control boards are interface boards, others are pulse generators and yet others are step boards. Each of the different interface minor control boards is designed to accept signals from a different monitoring source and convert these signals into a suitable DC signal. The amplitude of said DC signal is indicative of whether the heating or cooling system is demanding more or less power. The DC signal is transmitted to a minor control board which is a pulse generating circuit and this last mentioned minor control board produces ADD or SUBTRACT signals in response to the amplitude of said DC signal. The ADD and SUBTRACT signals are transmitted to minor control boards which accomplish a step function; i.e., they "cut in" a new power unit or "cut off" an already activated power unit. These power units can be turned on and turned off in a "first-on, first-off" mode of operation or in a "first-on, last-off" mode of operation. Finally a turn around minor control board is employed to enable the system to operate in a circular fashion when the system is called upon to operate in a "first-on, first-off" mode of operation.

The objects and features of the present invention will be better understood in view of the description hereinafter taken in conjunction with the drawings, wherein.

Figure 1:
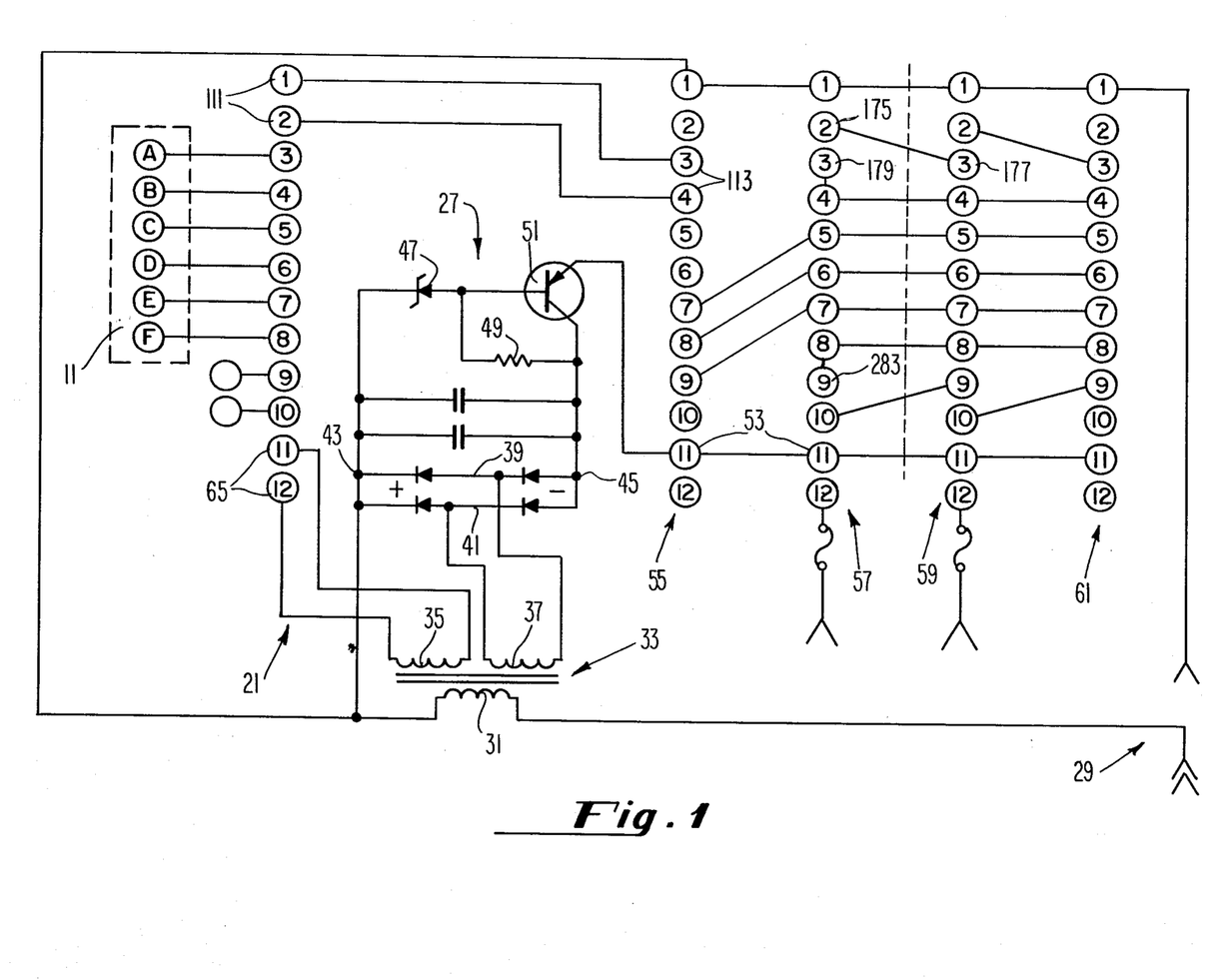
FIG. 1 is a schematic diagram of a major control circuit mounted on the major control board.

Consider FIG. 1 which shows the schematic view of the major control board. In FIG. 1 there is shown a terminal array 11. It is from these terminals that the system obtains signals being generated in response to the equipment whose temperature is being monitored. In other words, the user of the present controller system would have some heating or cooling equipment which would have its own temperature monitoring means. Said heating or cooling equipment is normally designed to provide a signal through some means and this signal would indicate that there was a need to add more heat, or in the alternative to cut out some of the heat, or in another alternative, to add or cut out cooling or refrigeration.

Figure 2:
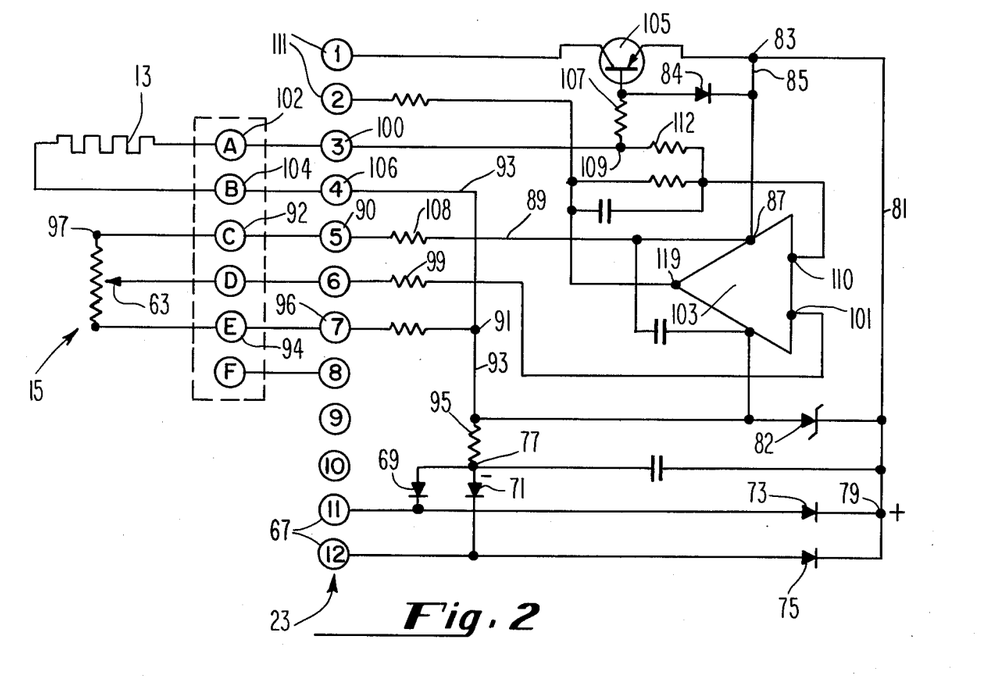
FIG. 2 is a schematic diagram of a first type circuit mounted on one form of interface minor control board.
Figure 3:
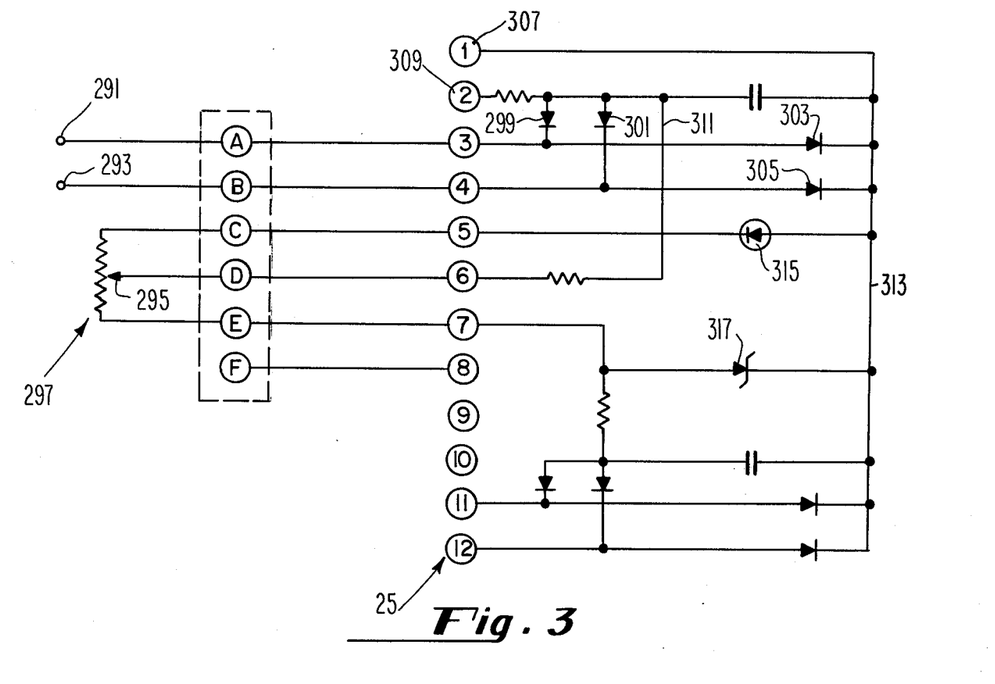
FIG. 3 is a schematic diagram of a second type circuit mounted on a second form of interface minor control board.

As can be seen in FIG. 2, the user's system might involve a thermistor 13 in combination with a potentiometer 15. On the other hand, as can be seen in FIG. 3, the user's system might directly provide a DC signal or an AC signal on terminals 291 and 293 or might provide simply the leg of a bridge as represented by potentiometer 297. In FIG. 2, the thermistor 13 would be located in proximity to the heated location or cooled location being monitored, while the potentiometer 15 would provide the means for setting the desirable temperature (such as a thermostat).

Returning to FIG. 1 it should be noted that there is an interface plug in position 21 having a plurality of pins circle numbered 1 through 12. Either of the interface cards or minor control boards shown on FIGS. 2 or 3 could be plugged in at the plug-in location 21 of FIG. 1, and the circled terminal means 1 through 12, shown in position 23, in FIG. 2, and position 25, in FIG. 3, would be the female yaxley-plug means which would receive the male yaxley plug means of FIG. 1.

As can be seen in FIG. 1, there is a power source circuit 27 shown mounted on the major control board. The major control board is plugged into the line power by the plug 29 which provides AC power to the primary winding 31 of the transformer 33. One of the secondary windings 35 provides AC power to the circled 11 and 12 terminals of the plug-in position 21, while the other secondary winding 37 provides AC power to the lines 39 and 41. The AC signal applied to lines 39 and 41 is rectified to provide a DC signal at the terminals 43 and 45 with the polarities as shown. The Zener diode 47 in conjunction with the resistor 49 provides a constant bias across the transistor 51 so that upon the occasion that there is a supply of current provided to any one of the terminals 53, (circled 11 terminals on any of the boards), the transistor 51 will conduct.

Figure 4:
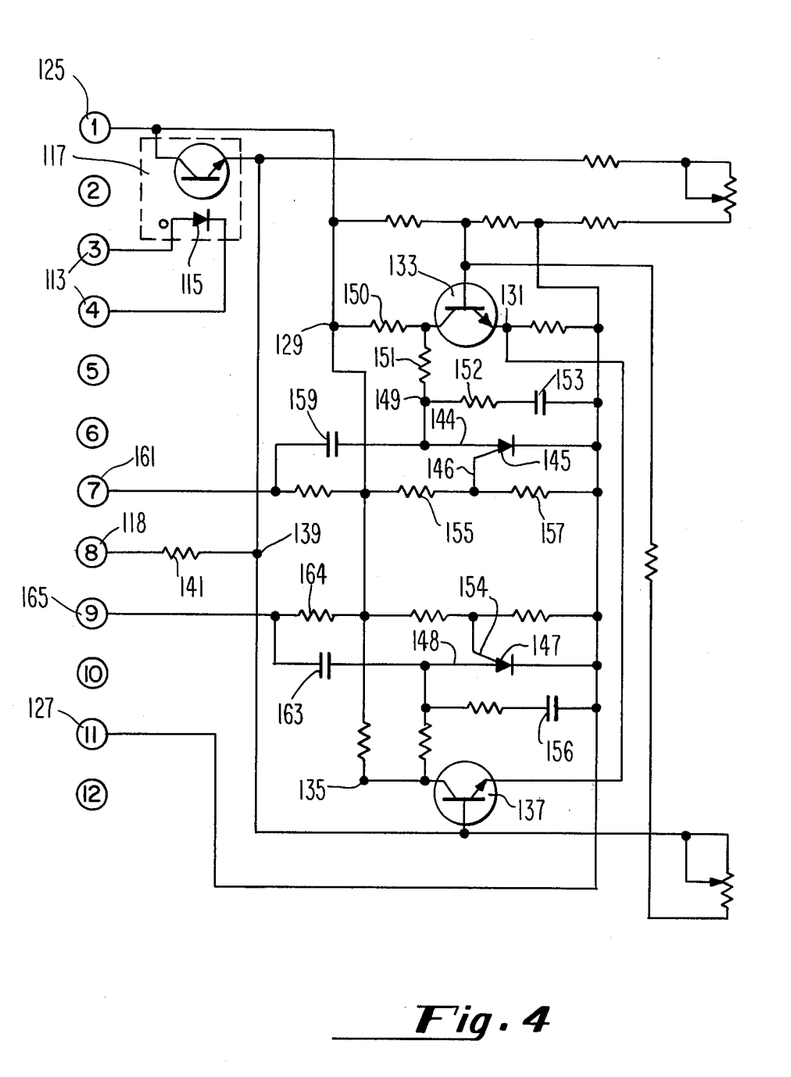
FIG. 4 is a schematic diagram of a pulse forming circuit for a minor control board.

Now as can be further seen in FIG. 1, there is a plurality of plug-in positions (55, 57, 59 and 61) each having circled terminal pins (1 through 12). It will be noted that the circled 11 terminals are common connected as are the circled 1 terminals. It will further be noted that the circled 1 terminals are connected to the line voltage supply. The pulse generator circuit, which is mounted on a minor control board and as shown in FIG. 4, is mounted at the plug in position 55 on FIG. 1. The operation of the pulse generator and the signals that it generates while mounted in the position 55, will be discussed hereinafter.

It should be noted that in FIG. 1 there is a broken line between the plug-in positions 57 and 59 and this is to indicate that there is a plurality of plug in positions therebetween. The plug-in position 61 is the last plug-in position. The end around circuit is mounted on the minor control board that is normally plugged in to the position 61.

Let us consider that the minor control board, whose circuit is shown in FIG. 2, is in fact plugged into the plug-in position 21 and that the heating system is equipped with a thermistor 13 for monitoring purposes, as well as a potentiometer 15 for the thermostat. The desired temperature will be set by the movable tap 63 and now we must examine the circuit to find how the setting of the potentiometer 15 provides the signal to cut in or cut out more or less power units.

It will be recalled that when we discussed FIG. 1, that we found that there was an AC signal provided to the circled 11 and 12 terminals of the plug-in position 21. We further discussed that the male terminals at the plug-in position 21 would be connected with the female terminals of the circuit shown in FIG. 2 and particularly at the plug-in position 23. Accordingly the AC signal provided by the secondary winding 35 in FIG. 1 (and therefore provided by the circled 11 and 12 terminals, which are collectively identified in FIG. 1 as terminals 65), it also provided at the collectively identified terminals 67 in FIG. 2; i.e., circled 11 and 12 terminals of the circuit shown in FIG. 2. The four diodes 69, 71, 73 and 75 in FIG. 2 provide a full wave rectification for the AC power on the terminals 67 and therefore provide a DC signal across the terminals 77 and 79 which DC signal has the polarity shown.

With the DC signal on the terminals 79 and 77 as shown, we find there will be current along the line 81, to the terminal 83, down through the line 85, to the terminal 87, from there a 9:00 position, on the line 89, through the board terminal 90, and through the terminal 92, through the potentiometer 15, back through the terminal 94, through the terminal 96, to the terminal 91, down therefrom at 6:00 o'clock on the line 93, through the resistor 95 on to complete the circuit at terminal 77. Accordingly there is a voltage developed across the potentiometer 15. Depending upon where the tap 63 is located, there will be a voltage developing between the terminal 97 of the potentiometer 15 and the tap 63. The voltage between the terminal 97 and the tap 63 is applied through the resistor 99 to the input terminal 101 (one of two input terminals) of the operational amplifier 103.

Simultaneously with the current flow just described, it should be noted that there is current flow from the terminal 83, through the emitter and the base of the transistor 105, through the resistor 107 to the terminal 109, from there at 9:00 o'clock angle, through the terminal 100, through the terminal 102, through the thermistor 13, back through the terminal 104 through terminal 106, downward along line 93 to terminal 91, through the resistor 95, to the terminal 77. Hence the transistor 105 is biased to conduct if in fact there is a load placed across the terminals 111, in FIG. 2; i.e., circled 1 and 2 terminals of the plug-in position 23.

If we examine FIG. 1 we find that the circled 1 and 2 terminals collectively identified as terminals 111, are connected to circled 3 and 4 terminals of the plug-in position 55 (FIG. 1) which are collectively identified as terminals 113. The terminals 113 appear in FIG. 4 and it can be seen in FIG. 4 that there is a light emitting diode 115 connected across the terminals 113. The light emitting diode 115 is part of a photocoupler 117, whose role will be described more fully hereinafter.

If we return to FIG. 2, we find that if the output terminal 119 is negative, then we have the transistor 105 conducting and passing current through the circled 1 terminal of the terminals 111, on through the light emitting diode 115 (shown in FIG. 4) back through the circled 2 terminal of the terminals 111 in FIG. 2, and then to the output terminal 119 of the operation amplifier 103.

In order for the transistor 105 to conduct relatively intensely, the terminal 119 is rendered relatively negative with respect to terminal 83. In order for terminal 119 to be negative, input terminal 101 must be relatively negative with respect to input terminal 110. The term "relatively" is used throughout the description because the actual voltage values may be negative or positive with respect to zero potential. It should also be understood that transistor 105 conducts at all times. When it conducts intensely, numerous ADD pulses are generated (as will be explained in connection with the description of FIG. 4) and when it conducts at some predetermined intensity representing an equilibrium condition temperature-wise, neither ADD nor SUBTRACT pulses will be generated. When it conducts even less intensely than just described, SUBTRACT pulses will be generated. The generation of ADD and/or SUBTRACT pulses or neither will be considered in connection with the description of FIG. 4.

Consider FIG. 2 again and by way of example let us consider a condition which would make terminal 101 relatively negative with respect to terminal 110. By inspection of FIG. 2, it can be seen that terminal 97 (the upper terminal of potentiometer 15) is at a more negative voltage than terminal 83, because of the voltage drop across resistor 108. The voltage drop across the potentiometer 15, from point 97 to tap 63, plus the voltage drop across resistor 99, renders the voltage at terminal 101 considerably more negative than point 83. If we consider the voltage at input terminal 110, it is the voltage at terminal 83, less the voltage drop across resistor 107 and resistor 112, which makes the voltage on terminal 110 relatively positive with respect to terminal 101, depending on the current conduction through resistor 107. Resistor 107 and 112 are chosen (value-wise) such that if the temperature of the thermistor 13 equals the temperature "set" on the potentiometer 15, the voltage value at 119 will cause the transistor 105 to conduct and provide only sufficient current to photocoupler 117 (FIG. 4) so that no ADD or SUBTRACT pulses will be generated. If thermistor 13 is hot, its resistance will be low, the current demand through resistor 107 will be high, and terminal 110 will be only slightly more positive than terminal 101. Accordingly, terminal 119 will be only slightly negative and transistor 105 will be only slightly conductive. As will be explained in connection with FIG. 4, this condition leads to the generation of SUBTRACT pulses. On the other hand if the thermistor 13 is cold compared to the "setting" on potentiometer 15, then the thermistor resistance will be high, thus relatively little current will be demanded through resistor 107. Under these circumstances terminal 101 will be relatively negative with respect to terminal 110 and accordingly output terminal 119 will be relatively negative. Under these last described conditions, transistor 105 will conduct relatively intensely and as we will see when we study FIG. 4, ADD pulses will be generated.

While we are considering FIG. 2, it should be noted that if thermistor 13 should fail for any reason (burn out or the like), the base of transistor 105 will see an open circuit and the transistor will not conduct. This is a fail safe feature. It should also be noted that the operational amplifier 103 may be a Texas Instrument 741 or any other equivalent operational amplifier. The diode 84 protects the transistor 105 from damage due to surges. The Zener diode 82 provides a constant voltage source to the operational amplifier 103.

Before we study FIG. 4, we should consider some of the design philosophy of the present system and in particular the significance of the feedback circuit. When a heating unit is added in, or turned on, additional heat will be applied to the location being heated. As each heating unit is turned on, the temperature of the location being heated will approach the desired temperature; i.e., the temperature set on potentiometer 15. As the temperature of said location approaches the desired temperature, it behooves the system to wait for a period of time after a heating unit has been added to see if the newly-added heat will heat said location to the desired temperature. If the system does not wait for some period of time, the inertia of the heating unit will cause the temperature of said location to rise higher than the desired temperature. The closer the temperature of said location approaches the desired temperature, the more necessary it is to allow the inertia of the system to operate before adding another heating unit. The present system operates taking into account the foregoing philosophy; i.e., the more heating units that are turned on, the longer the effect of the heat inertia is allowed to continue before a new heating unit is added. This design philosophy is accomplished by an analog circuit, shown in FIG. 4, that is conditioned by the difference between the temperature of the monitor (e.g. thermistor 13) and the "set" temperature, as well as by the value of the feedback signal. The feedback signal is indicative of how many stepper units are turned on.

The feedback circuit acts as an anticipatory indicator. For instance, even though the difference between the monitor and the desired temperature might be detected as no change or very little change in said location temperature, the feedback circuit would increase the time between ADD pulses because it would detect that heating units have been turned on and their heat will close the difference now being indicated as minimal by the monitor and "desired temperature" means. Bearing in mind the above philosophy, let us study the operation of FIG. 4.

In FIG. 4 there is B+ and B− voltage applied between terminals 125 and 127. Accordingly there is a voltage applied between terminals 129 and 131 tending to cause transistor 133 to conduct, and also a voltage between terminal 135 and 131 tending to cause transistor 137 to conduct. Actually both of the transistors 133 and 137 conduct all the time, but it depends on the intensity of conduction of the photocoupler 117 as to how much the transistors 133 and 137 respectively conduct.

Transistor 137 conducts more or less, depending upon whether there is a relatively large amount of current available at point 139 or a relatively small amount available thereat. The amount of current available at point 139 depends on the feedback signal appearing at terminal 118. If terminal 118 is relatively negative, then a good part of the current from photocoupler 117 is bled off through resistor 141. On the other hand if the feedback signal becomes relatively positive, there is a lesser amount of current bled off through resistor 141 and therefore a relatively large amount available to the base of transistor 137.

It should be noted that when transistor 137 conducts relatively heavily, the point 131 goes relatively positive and therefore transistor 133 conducts less. In contrast, when transistor 137 conducts less heavily, point 131 goes relatively negative and transistor 133 conducts more. It follows that the degree of conduction of transistor 137 controls the degree of conduction of transistor 133. The circuitry is designed so that when the temperature of the location, as detected by thermistor 13, is equal to the desired temperature, the transistors 133 and 137 will conduct equally.

Before further discussing the roles of transistors 133 and 137, note that there are two programmed unijunction transistors (PUT's) 145 and 147 connected in the circuit of FIG. 4. As will be described hereinafter, when the respective PUT's conduct they cause ADD or SUBTRACT pulses to be generated. By inspection of FIG. 4 it can be seen that PUT 145 has its anode 144 connected to point 149 which is a tap on the voltage divider, made up of resistors 150, 151 and 152 connected through capacitor 153 between B+ and B−. The resistors 150, 151 and 152 together with capacitor 153 provide an R-C time constant for charging capacitor 153.

It should be further noted that the control element 146 of PUT 145 is connected to the center of a voltage divider made up of resistors 155 and 157, connected between B+ and B−. The resistors of the two above described voltage dividers are chosen so that the control element is more positive than the anode. When the anode 144 becomes more positive than the control element 146, PUT 145 will conduct. In order for PUT 145 to conduct, a positive voltage must be built up on capacitor 153.

Capacitor 153 will have a voltage built up thereon (with the polarities as shown) unless transistor 133 conducts with sufficient intensity, or current demand, so that no current or very little current, is available to charge capacitor 153. In a state of temperature satisfaction; i.e., both transistors 133 and 137 conducting equally, the current demand of transistor 133 will be sufficiently high so that there will be insufficient current to charge capacitor 153 to a voltage necessary to "fire" PUT 145. However, when transistor 137 conducts relatively intensely so that transistor 133 conducts relatively lightly, capacitor 153 will become sufficiently charged after some discrete period of time (depending on the R-C time constant) and hence PUT 145 will conduct. When PUT 145 conducts, a negative ADD pulse is passed through capacitor 159 to the ADD pulse terminal 161 and in addition capacitor 153 discharges.

The generation of a SUBTRACT pulse is quite similar. PUT 147 is connected to a voltage divider (as can be seen in FIG. 4) in the same way as was PUT 145 and for the same purpose. When the anode 148 of PUT 147 becomes more positive than the control element 154, in response to capacitor 156 becoming sufficiently charged, PUT 145 conducts thereby passing a negative SUBTRACT pulse, through capacitor 163 to SUBTRACT pulse terminal 165. While the charge up of capacitor 156 depends upon the current demand of transistor 137, the current demand of transistor 137 depends on the current available at point 139 as explained earlier.

Assume that the photocoupler 117 is conducting relatively heavily indicating that heat is needed at the monitored location. As more add units are cut in, the feedback terminal 118 becomes more negative, as will be explained below, and the transistor 137 will conduct less heavily. When transistor 137 conducts less heavily, transistor 133 conducts more heavily, thereby lengthening the time for capacitor 153 to become fully charged. Hence the effect of the last add unit is permitted to take place before another heating unit or add unit is activated. By delaying the time between activating the add units the heated location is less apt to be excessively heated, or overheated, due to the inertia of the system.

Of course, if the photocoupler 117 conducts less because the thermistor 13 indicates that the temperature at the heated location is approaching the desired temperature, then there will be less current available at point 139 and as explained above, transistor 137 will conduct less. Hence transistor 133 will conduct relatively more intensely thereby further delaying the charge up of capacitor 153, thus further delaying the "firing" of PUT 145 and the generation of a negative ADD pulse at terminal 161.

With respect to SUBTRACT pulses we will first consider that the location is heated to a higher temperature than desired. This condition would cause the output terminal 119 of operational amplifier 103 (FIG. 2) to be only slightly negative, hence transistor 105 would not conduct heavily and photocoupler 117 would not conduct heavily. If photocoupler 117 does not conduct heavily, there will be no great source of current at point 139 and therefore transistor 137 will not conduct intensely. While transistor 137 will not conduct intensely, it will conduct. However, the current demand of transistor 137 will be sufficiently small so that capacitor 156 will readily charge up to a point where PUT 147 will conduct thereby providing a negative SUBTRACT pulse to terminal 165.

As will be apparent hereinafter the SUBTRACT pulse will cut out one of the heating units and reduce the temperature at the monitored location. As the temperature at the monitored location cools, the resistance of the thermistor 13 reduces and transistor 105 conducts more heavily. As explained above, when transistor 105 increases its conduction, the voltage differential at the input terminals of operational amplifier 103 increases and the output terminal 119 becomes more negative. As explained earlier, as terminal 119 goes more negative, more current is available at point 139 to drive transistor 137 and increase the period between the SUBTRACT pulses.

Obviously if the difference between the temperature of a hot thermistor 13 and the setting on potentiometer 15 were large (representing to demand to cool) transistor 137 would conduct very little and the PUT 147 would be fired at a relatively fast repetition rate, thus providing SUBTRACT pulses at a relatively fast repetition rate.

Thus far, we have considered part of the operation of the major control board; the operation of the interface board with a thermistor and a potentiometer; and the operation of the pulse generator board. As was mentioned above, the present system operates in at least two modes. In one mode the first heating unit turned on is the last heating unit turned off. In the other mode, the first unit turned on is the first unit turned off. Let us consider a circuit which provides the first-on, last-off, mode of operation.

Figure 5:
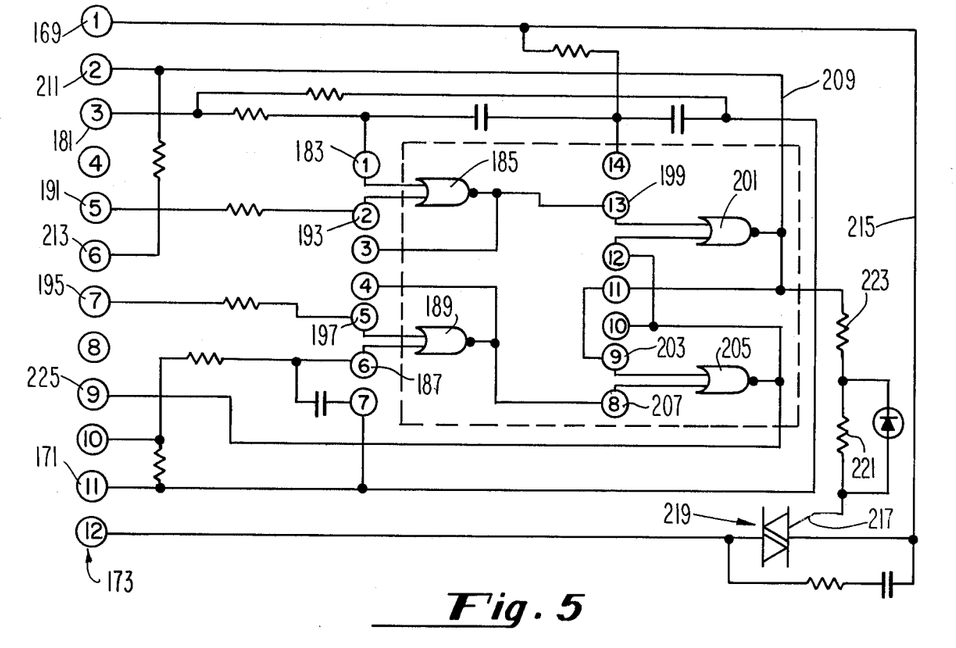
FIG. 5 is a schematic diagram of a stepper circuit for a minor control board used to step up or step down in a first-on, last-off mode of operation.

Consider FIG. 5. In FIG. 5, B+ power supply is provided to terminal 169, while the B− power supply is provided to terminal 171. Examine FIG. 1 momentarily. It should be noted that the circuit shown in FIG. 5 fits into terminal position 57 (FIG. 1) and the circled (1 through 12) terminals 173 of FIG. 5 fit in contact with the circled terminals 1 through 12 of position 57. In FIG. 1, note that circled 2 terminal 175 is connected to circled 3 terminal 177 of a subsequent board located in terminal position 59. Also note, in FIG. 1, that circled 3 terminal 179 of position 57 is common connected to all of the circled 4 terminals.

Consider now that there are four circuit boards each having a circuit such as that shown in FIG. 5, and the group of four is located in positions between but including positions 57 and 59 shown in FIG. 1. When each of the four boards is connected into the major control board, FIG. 1, there will be B+ and B− power supply respectively applied to terminals 169 and 171 (FIG. 5) as just described. Note, in FIG. 5, that the circled 3 terminal 181 is connected to the B− power supply. Hence there is a negative voltage applied to terminal 183 of NOR gate 185. Note that the ADD terminal 191 is connected to the input terminal 193 of NOR gate 185. Also note that the SUBTRACT terminal 195 is connected to the input terminal 197 of the NOR gate 189. As was mentioned earlier the ADD and SUBTRACT pulses are negative pulses. Accordingly, if an ADD pulse is applied to terminal 191, then the two inputs to NOR gate 185 will be negative and it will provide a positive pulse to input terminal 199. Each of the NOR gates in FIG. 5 operates such that if either of its inputs is positive, its output is negative, hence if both inputs are negative, the output of the NOR gate is positive. Accordingly, a positive pulse will be transmitted to NOR gate 201 thus providing a negative output signal from NOR gate 201.

The negative output signal from NOR gate 201 is transmitted in three directions. In the first direction, it serves to secure a latch circuit. The negative signal from NOR gate 201 is transmitted to input terminal 203 of NOR gate 205. The output signal from NOR gate 205, at this time, depends on the input signal on input terminal 207, which in turn depends on the output signal from NOR gate 189. In order to determine the polarity of the signal from NOR gate 189 let us look at SUBTRACT terminal 165 in FIG. 4. SUBTRACT terminal 165 is positive because it is connected through resistor 164 to the B+ supply and it is only when PUT 147 fires that the SUBTRACT terminal 165 goes negative. Accordingly, to similar reasoning, it should be understood that ADD terminal 161 is normally of positive polarity unless PUT 145 fires.

Returning now to FIG. 5, we find that since terminal 195 (connected to terminal 165, FIG. 4) is positive the output from NOR gate 189 will be negative and hence there will be two negative signals applied to NOR gate 205 thereby providing a positive output signal therefrom. The positive output signal from NOR gate 205 is applied as an input signal to NOR gate 201 to continue to provide a negative output signal therefrom and thus latch the circuit with the output signals from NOR gates 201 and 205 being respectively negative and positive as just described.

The second path over which the negative signal from NOR gate 201 is passed is along line 209 to terminals 211 and 213. Circled 6 terminal 213 is the feedback circuit terminal described earlier and an examination of the major control board reveals that all of the circled 6 terminals are common connected to circled 8 terminal 118 of FIG. 4. Hence it becomes apparent that if a heating unit, such as circuit 5, is added in, it provides a negative signal to circled 8 terminal 118 of FIG. 4.

At the same time the negative output signal from NOR gate 201 renders the circled 2 terminal 211 negative and the significance of this effect will be explained immediately hereinafter.

Normally, the circled 2 terminal of the circuit of FIG. 5 is positive. This is because there is voltage applied from B+, along line 215, through the control element 217 of Triac 219, through resistors 221 and 223, along line 209 to terminal 211. If we examine the major control board in FIG. 1, we find that a positive potential on a circled 2 terminal is applied to a circled 3 terminal of a succeeding board. Hence the potential on all of the circled 3 terminals is controlled by the potential on the circled 2 terminal of the preceding board. Thus, even though there was a negative ADD signal applied to every minor board mounted on the major board, only the board mounted in position 57 would respond because its circled 3 terminal was negative. However, once a circuit, such as the circuit of FIG. 5, is latched, its circled 2 terminal goes negative and the circled 3 terminal of the succeeding board goes negative, thereby permitting the succeeding minor board to be turned on with the next succeeding ADD pulse.

There is one other thing that happens when the output signal of NOR gate 201 goes negative. When NOR gate 201 goes negative, it turns on the Triac 219 which provides current to the load.

Assume now that the circuit of FIG. 5 has been latched, or added in, and the system calls to subtract that unit. Under such circumstances initially, the output signal from NOR gate 201 would be negative and the output signal from NOR gate 205 would be positive. In order to subtract a unit a negative SUBTRACT pulse (whose generation was earlier described) is transmitted to circled 7 terminal 195. Assume for the moment that there is a negative signal applied to input terminal 187. The negative SUBTRACT pulse input to NOR gate 189 provides a positive pulse output signal which is transmitted to input terminal 207 of NOR gate 205. The positive input signal to NOR gate 205 provides a negative output signal therefrom which is applied as an input to NOR gate 201. Accordingly, both of the input signals to NOR gate 201 are negative thereby providing a positive output signal therefrom. The positive output signal from NOR gate 201 returns to the input of NOR gate 205 to latch the circuit. In addition, the positive output signal from NOR gate 201 turns off triac 219, makes the feedback terminal 213 more positive and renders terminal 211 positive.

We assumed above that there was a negative signal to terminal 187. The negative signal to terminal 187 is accomplished by the relationship between the circled 9 and 10 terminals. If we examine FIG. 1, we find that the circled 9 terminal of each board position is connected to the circled 10 terminal of the preceding position. Hence, if a unit is turned on, and the output from NOR gate 205 is positive, then the unit's circled 9 terminal (terminal 225 in FIG. 5) is rendered positive. Accordingly, the circled 10 terminal of each unit which precedes a unit that is turned on will be at a positive potential. It follows then that only the last unit turned on can be the first one turned off because it will reside next to a circled 9 terminal which is negative. As each SUBTRACT signal is generated, it turns off the last unit in the line which is turned on and this action readies the preceding unit to accept the next SUBTRACT pulse.

Figure 6:
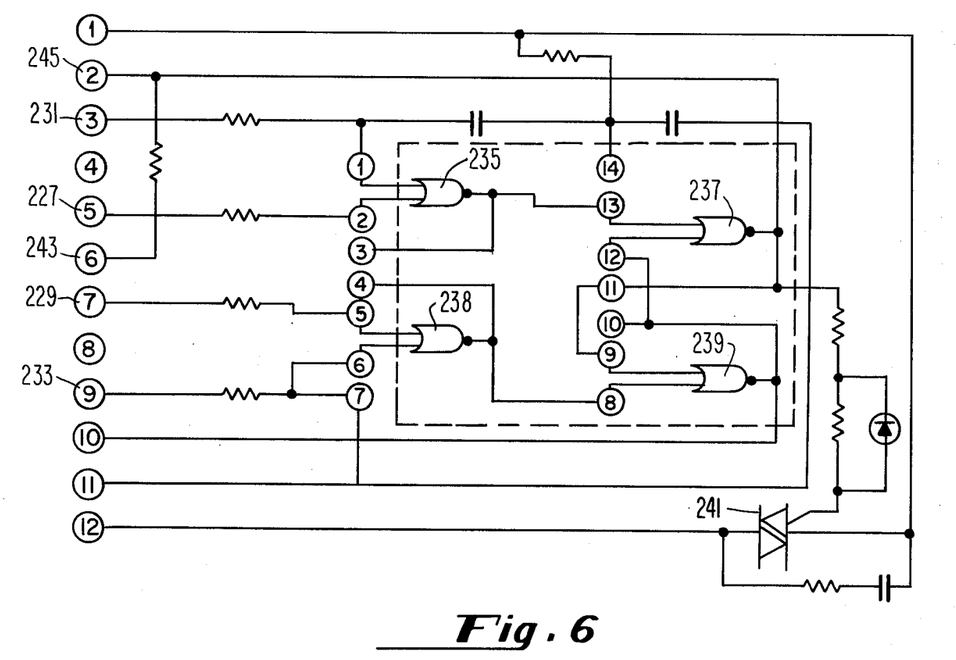
FIG. 6 is a schematic diagram of a stepper circuit for a minor control board used to step up or step down in a first-on, first-off mode of operation.
Figure 7:
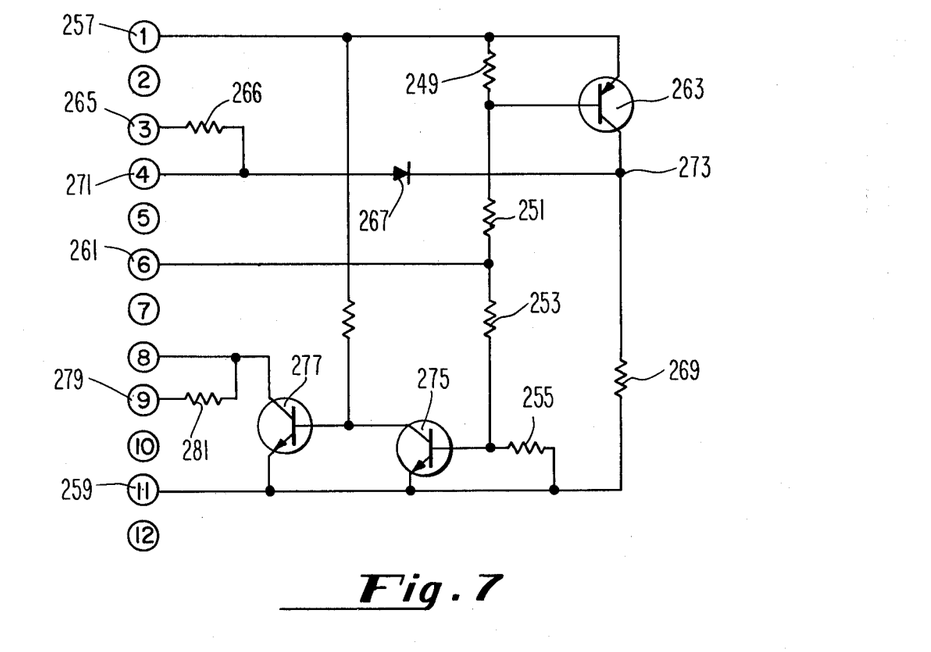
FIG. 7 is a schematic diagram of an end position circuit for use with a series of stepper circuits to effect the turn-around in a first-on, first-off mode of operation.

The foregoing is a description of the first-on, last-off operation. Let us consider now the first-on, first-off operation which requires that the system use the circuit of FIG. 6 in place of the circuit of FIG. 5. Assume that there are four minor control circuit cards mounted in four positions between and including the terminal positions 57 and 59 (FIG. 1), and further assume that an end circuit such as shown in FIG. 7 is plugged into position 61 (FIG. 1).

As we determined above, in the steady state both the ADD terminal 227 and the SUBTRACT terminal 229 have a positive voltage thereon, while circled 3 terminal 231 and circled 9 terminal 233 must have a negative potential thereon in order to have the circuit respond to an ADD or SUBTRACT signal. Assume for the moment that we have a negative signal on terminals 231 and 233. We will discuss hereinafter how we provide a negative voltage to the circled 3 and 9 terminals 231 and 233.

When a negative ADD signal is applied to terminal 227 there are two negative signals to NOR gate 235 and hence a positive signal to the input of NOR gate 237. NOR gate 237 provides a negative output signal which renders the output from NOR gate 239 positive and that positive output signal returns to the input of NOR gate 237 to latch the circuit. The negative output signal from NOR gate 237 turns on triac 241, while rendering the feedback terminal 243 and the circled 2 terminal 245 both negative. The foregoing operation is the same as the description of the circuit of FIG. 5 and therefore no further discussion of the operation of NOR gates 237, 239, 235 or 238 appears necessary. However, it should be noted that the circled 3 terminal, the circled 9 terminal and the circled 10 terminal are connected differently than those in FIG. 5. The circled 9 terminal, because of the connection in FIG. 1, is connected in common to all of the circled 8 terminals and so we must examine the end circuit of FIG. 7 to comprehend the changes.

The end circuit (FIG. 7) operates as follows, considering FIGS. 7 and 6. If no stages are turned on, we must provide a negative signal to the circled 3 terminal of the first stage in order to provide an ADD operation. Note in FIG. 7 that there is a voltage divider made up of resistors 249, 251, 253 and 255 located between the B+ power supply on terminal 257 and the B− power supply on terminal 259. With no units turned on, the feedback signal as applied to terminal 261 will be positive so transistor 263 is not conducting. Now if we examine FIG. 1 we find that the circled 3 terminal of any minor board is connected to the circled 2 terminal of its preceding board. It will be recalled however that if a unit is not turned on, its circled 2 terminal is positive. Hence there is current flow from B+ of the stage preceding the end circuit of FIG. 7, through the circled 2 terminal of the stage, through the circled 3 terminal 265 of FIG. 7, through resistor 266, through diode 267, through resistor 269 to the B− terminal 259. The voltage drop across resistor 266 renders the circled 4 terminal 271 negative and if we examine FIG. 1 we find that such a negative potential is applied to the circled 3 terminal 179 of FIG. 1. Hence terminal 231 of FIG. 6 is negative and awaits the first ADD signal.

When the first unit is turned on the feedback signal is negative thereby rendering the transistor 263 of FIG. 7 conductive. When transistor 263 conducts, the point 273 goes relatively positive thereby rendering terminal 231 FIG. 6 positive through the common circuit of the major control board (FIG. 1) just described. Prior to any stages being turned on, transistor 275 is rendered conducting and its current demand renders transistor 277 non conducting. However, when all of the stages get turned on and the feedback signal goes negative to B−, transistor 275 gets turned off but transistor 277 gets turned on. When transistor 277 conducts, there will be current flow from the circled 10 terminal of the preceding stage, through the major control board (FIG. 1) to terminal 279 of FIG. 7, through resistor 281 and through transistor 277. The voltage drop across resistor 281 is applied through the major control board (FIG. 1) to terminal 283 FIG. 1 and hence to terminal 233 of FIG. 6. It should be apparent then that when all of the minor boards are turned on the first one to be turned off is the first one that was turned on.

If fewer than all minor boards are turned on, then the stage before the end board of FIG. 7 will be non-conducting. This means that the circled 10 terminal of the stage preceding the end board will be negative. Accordingly, terminal 279 will be negative and by connection through the major board terminal 238 (FIG. 1) will be negative. Hence the first SUBTRACT pulse will turn off the board located in position 57. Its circled 10 terminal becomes negative to ready the succeeding board to be turned off in response to the next SUBTRACT pulse. Thus the first on is the first off.

FIG. 3 shows a different type interface board than that described with FIG. 2. The circuit in FIG. 3 shows a direct input voltage across terminals 291 and 293 or a system which has a potentiometer input from the tap 295 of potentiometer 297. When the terminals 291 and 293 are employed the user provides a voltage which indicates whether or not the desired location needs heat. The voltage is full wave rectified by the diodes 299, 301, 303 and 305. This rectification provides a DC signal at terminals 307 and 309 with the polarities as shown. The signal from terminals 307 and 309 is applied to the photocoupler 117 as described above and the operation is identical.

If the user employs the potentiometer 297 then the DC signal is applied through the lines 311 and 313 directly to the terminals 307 and 309 and the operation is identical. The L.E.D. 315 provides an initial bias to the potentiometer 297 to improve its range and the Zener diode 317 provides a constant voltage to the potentiometer.

While the invention has been described with heating units as the load, it should be understood that the loads could be cooling units and boards controlling both heating units and cooling units can be interchangeably mounted on the same board.

Figure 8:
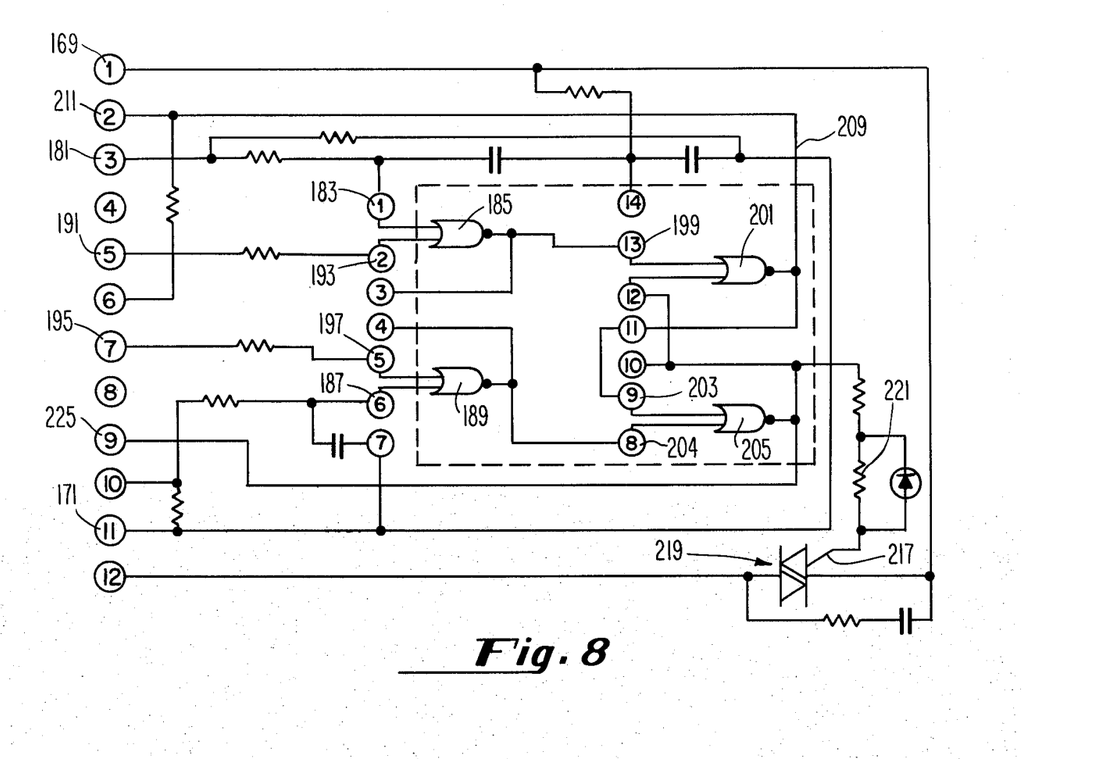
FIG. 8 is a schematic diagram of a second form of stepper circuit used in a first-on, last-off mode of operation.

FIG. 8 is a schematic of a stepper circuit which turns off the load when the unit is turned on. By examination it can be seen that FIG. 8 is a circuit which is almost identical to FIG. 5 and operates substantially the same way. The difference between the circuitry of FIG. 8 and FIG. 5 is that the output signal of NOR gate 205 is transmitted to turn on triac 219 and the output signal from NOR gate 201 latches NOR gate 205. This circuit operates such that in the normal state the output of 205 is negative and hence triac 219 is turned on (either heating or cooling). An ADD pulse cuts the triac off and a SUBTRACT pulse turns the triac on.

We claim:

1. A system for turning on and alternatively turning off a plurality of electrical power stages, related to providing energy for a specific location, so that the total electrical power demand for said location is incrementally increased or decreased by an addition and alternatively a subtraction of said stages comprising in combination: a major control circuit board having a plurality of electrically connectable means each of which is disposed in a different position, said major control circuit board further having electrical circuit path means connecting said plurality of electrically connectable means and further having a source of electrical power connected to said electrical circuit path means; an interface circuit board means connected to said major control board at a first of said electrically connectable means, the interface circuit formed to accept monitoring signals from said location and convert said monitoring signals into command signal form; pulse forming circuit board means connected to a second of said electrically connectable means, to receive said command signal through said electrical circuit path means to selectively generate ADD and SUBTRACT pulses in response thereto; a plurality of stepper circuit board means connected respectively to said plurality of power stages and further connected to said major control circuit board at a plurality of said electrically connectable means to respectively receive said ADD and SUBTRACT pulses and in response thereto cause said power stages to be activated and alternatively deactivated; and feedback circuit means connected to each of the stepper circuit boards and the pulse forming circuit board to provide an analog signal indicative of the number of said power stages activated whereby the period between the generation of said ADD and SUBTRACT pulses will be altered depending on the number of said power stages activated.

2. A system according to claim 1 wherein the stepper circuits are formed to interact with one another so that the first power stage turned on is the last power stage turned off.

3. A system according to claim 1 wherein said feedback circuit means includes an end circuit board means and whereby the stepper circuits are formed to interact with one another and said end circuit means so that the first power stage turned on is the first power stage turned off.

4. A system according to claim 3 wherein said stepper circuit boards are interconnected in a series, with a first stepper circuit board through an Nth stepper circuit board, and wherein the end circuit board includes circuitry means to ready said first stepper board to be activated by an ADD pulse when none of said stepper circuit boards has been activated and to ready said first stepper board to be deactivated by a SUBTRACT pulse when all of said stepper circuit boards has been deactivated.

5. A system according to claim 1 wherein there is further included monitoring circuitry disposed at said location and connected to the interface circuit board and wherein the pulse forming circuit is formed to generate neither ADD nor SUBTRACT pulses when said monitoring circuitry generates a signal indicative of an equilibrium condition.

6. A system according to claim 1 wherein said pulse forming circuit includes a pair of transistors which conduct at all times that said system is operative and wherein said pair of transistors are connected to a pair of programmed unijunction transistors and an associated pair of capacitors whereby when either of said transistors conducts beyond a predetermined threshold, its associated capacitor will not charge sufficiently to activate its associated programmed unijunction transistor and wherein the activation of said programmed unijunction transistor causes a generation of either an ADD pulse or a SUBTRACT pulse.

* * * * *